(12) United States Patent
Tao et al.

(10) Patent No.: US 12,067,165 B2
(45) Date of Patent: Aug. 20, 2024

(54) HAPTIC REPRODUCTION SYSTEM AND DRIVING METHOD

(71) Applicants: Beijing BOE Technology Development Co., Ltd., Beijing (CN); BOE Technology Group Co., Ltd., Beijing (CN)

(72) Inventors: Yongchun Tao, Beijing (CN); Yuju Chen, Beijing (CN); Hui Hua, Beijing (CN); Xiaotong Liu, Beijing (CN); Xiaofeng Yin, Beijing (CN)

(73) Assignees: Beijing BOE Technology Development Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 115 days.

(21) Appl. No.: 17/620,590

(22) PCT Filed: Feb. 26, 2021

(86) PCT No.: PCT/CN2021/077999
§ 371 (c)(1),
(2) Date: Dec. 17, 2021

(87) PCT Pub. No.: WO2022/178792
PCT Pub. Date: Sep. 1, 2022

(65) Prior Publication Data
US 2023/0152893 A1    May 18, 2023

(51) Int. Cl.
*G06F 3/01* (2006.01)
*B06B 1/02* (2006.01)
(Continued)

(52) U.S. Cl.
CPC .......... *G06F 3/016* (2013.01); *B06B 1/0215* (2013.01); *B06B 1/0622* (2013.01); *G06F 3/0416* (2013.01); *G06F 3/0412* (2013.01)

(58) Field of Classification Search
CPC ...... G06F 3/016; B06B 1/0215; B06B 1/0622
See application file for complete search history.

(56) References Cited

U.S. PATENT DOCUMENTS

2002/0156807 A1   10/2002  Dieberger
2016/0313793 A1*  10/2016  Hong ............... G06F 3/016
(Continued)

FOREIGN PATENT DOCUMENTS

CN    102208138 A    10/2011
CN    107122056 A     9/2017
(Continued)

*Primary Examiner* — Ryan A Lubit
(74) *Attorney, Agent, or Firm* — IPro, PLLC

(57) ABSTRACT

A haptic reproduction system comprises: a touch display device, an upper computer and a waveform generator. The touch display device comprises a piezoelectric unit, a touch display panel and a touch driving unit. The piezoelectric unit is disposed on the touch display panel. The touch driving unit is electrically connected to the touch display panel and the upper computer, and is configured to acquire touch information and transmit the touch information to the upper computer. The upper computer is electrically connected to the waveform generator, and is configured to send a first waveform generation instruction to the waveform generator according to the touch information. The waveform generator is configured to generate a first waveform signal according to the first waveform generation instruction. The piezoelectric unit is electrically connected to the waveform generator, and is configured to resonate with the touch display panel under the drive of the first waveform signal.

14 Claims, 7 Drawing Sheets

(51) Int. Cl.
B06B 1/06 (2006.01)
G06F 3/041 (2006.01)

(56) References Cited

U.S. PATENT DOCUMENTS

| | | | |
|---|---|---|---|
| 2017/0205882 A1* | 7/2017 | Tanaka | G06F 3/016 |
| 2018/0164890 A1* | 6/2018 | Park | G06F 3/016 |
| 2019/0138140 A1* | 5/2019 | Akabane | G06F 3/04847 |
| 2019/0265793 A1* | 8/2019 | Costante | G06F 3/016 |
| 2020/0026354 A1* | 1/2020 | Swindells | G06F 3/016 |
| 2020/0379562 A1* | 12/2020 | Forest | B06B 1/183 |
| 2021/0048888 A1* | 2/2021 | Hamada | H10N 30/206 |
| 2021/0232246 A1* | 7/2021 | Xu | G06F 3/0412 |
| 2021/0232308 A1* | 7/2021 | Cruz Hernandez | G06F 3/04886 |

FOREIGN PATENT DOCUMENTS

| | | |
|---|---|---|
| CN | 109240485 A | 1/2019 |
| CN | 111459324 A | 7/2020 |

* cited by examiner

HAPTIC REPRODUCTION SYSTEM AND DRIVING METHOD

TECHNICAL FIELD

The present disclosure relates to the technical field of haptic reproduction, in particular to a haptic reproduction system and a driving method.

BACKGROUND

The human sensing system is mainly based on the visual sense, the auditory sense and the haptic sense. At present, the perception and presentation means of the visual sense and the auditory sense have already been mature. But, the study and industrialization of the haptic system are stagnant relatively because the mechanism of haptic sensing is complicated and involves the perception of various physical signals of human bodies in the environment such as mechanical signals, temperature signals, chemical signals and humidity signals.

The mass application of present capacitive touch screens developed from early resistive touch screens and the requirement for application scenarios such as virtual reality lead to an urgent demand for haptic perception and display.

SUMMARY

The objective of the embodiments of the present disclosure is to provide a haptic reproduction system and a driving method. The haptic reproduction system is able to realize haptic reproduction.

To fulfill the above objective, the embodiments of the present disclosure adopt the following technical solution:

in an aspect, a haptic reproduction system is provided, the haptic reproduction system comprises: a touch display device, an upper computer and a waveform generator;

wherein, the touch display device comprises a piezoelectric unit, a touch display panel and a touch driving unit, and the piezoelectric unit is disposed on the touch display panel;

the touch driving unit is electrically connected to the touch display panel and the upper computer, and is configured to acquire touch information and transmit the touch information to the upper computer;

the upper computer is electrically connected to the waveform generator, and is configured to send a first waveform generation instruction to the waveform generator according to the touch information;

the waveform generator is configured to generate a first waveform signal according to the first waveform generation instruction; and the piezoelectric unit is electrically connected to the waveform generator, and is configured to resonate with the touch display panel under the drive of the first waveform signal to change the friction on a touch surface of the touch display panel.

Optionally, the touch display panel comprises an active area, and the active area comprises at least one active sub-area;

the touch information comprises touch coordinates; and the upper computer is also configured to determine the active sub-area to which the touch coordinates belong, and send the first waveform generation instruction corresponding to the active sub-area, to which the touch coordinate belong, to the waveform generator.

Optionally, the touch information further comprises a touch time; and the upper computer is further configured to determine whether the touch coordinates change within the touch time; if not, the upper computer stops sending the first waveform generation instruction corresponding to the active sub-area, to which the touch coordinate belong, to the waveform generator.

Optionally, the touch display device further comprises at least one selection unit;

the selection unit is electrically connected to the upper computer, and is configured to provide a selection function and transmit selection information to the upper computer;

the upper computer is further configured to send a second waveform generation instruction to the waveform generator according to the selection information;

the waveform generator is further configured to generate a second waveform signal according to the second waveform generation instruction; and the piezoelectric unit is further configured to resonate with the touch display panel under the drive of the second waveform signal.

Optionally, the touch display panel comprises an active area, and the display area comprises at least one active sub-area;

the selection unit corresponds to at least one of the active sub-areas; and the upper computer is further configured to determine the active sub-area selected by a user according to the selection information, and send the second waveform generation instruction corresponding to the active sub-area selected by the user to the waveform generator.

Optionally, the touch display device further comprises a display driving unit;

the display driving unit is electrically connected to the touch display panel and the upper computer;

the upper computer is further configured to send an image display instruction to the display driving unit according to the touch information; and the display driving unit is configured to generate an image signal according to the image display instruction to enable the touch display panel to display an image.

Optionally, further comprising an amplification unit;

wherein, the amplification unit is electrically connected to the waveform generator and the piezoelectric unit, and is configured to amplify the first waveform signal; and the piezoelectric unit is further configured to resonate with the touch display panel under the drive of the amplified first waveform signal.

Optionally, the amplification unit comprises an amplifier, and the waveform generator comprises an FPGA waveform generator.

Optionally, the touch display panel further comprises a touch base plate and a first display panel, the touch base plate is disposed on a light emitting side of the first display panel, and the piezoelectric unit is disposed on a side, away from or close to the first display panel, of the touch base plate.

Optionally, the piezoelectric unit comprises a plurality of piezoelectric patches, and each of the plurality of the piezoelectric patches comprises a piezoelectric layer, and a first electrode and a second electrode located on two opposite sides of the piezoelectric layer;

the touch base plate comprises a substrate and a touch layer, the touch layer is disposed on a side, close to the first display panel, of the substrate; the plurality of the piezoelectric patches are disposed on a side, away from the touch layer, of the substrate; and the first electrodes of the plurality of the piezoelectric patches are all grounded, and the second electrodes of the plurality of the piezoelectric patches are all electrically connected to the waveform generator.

Optionally, the touch display panel comprises an active area, and the active area comprises at least one active sub-area; and a same waveform signal is accessed to the second electrodes of the piezoelectric patches located in a same active sub-area.

Optionally, the plurality of the piezoelectric patches are divided into two groups, and each of the two groups is disposed on two opposite sides of the touch base plate along a first direction, respectively.

Optionally, the touch display device further comprises a fixing part; and the fixing part is configured to fix the touch base plate and reserve a gap between the touch base plate and the first display panel.

Optionally, a size of the gap in a direction perpendicular to a plane where the substrate is located is greater than 2 μm.

Optionally, the fixing part comprises a support part and a bonding part;

wherein, the support part is disposed on a side edge of the first display panel, the material of the support part comprises a sound absorption material, and the bonding part is disposed on a side, away from the first display panel, of the support part, and is bonded with the touch base plate.

Optionally, the material of the bonding part comprises silicone, and a Young modulus of the silicone is less than 0.1 MPa.

Optionally, the touch display device further comprises a first frame;

the first frame comprises a first frame body and a second frame body, a step is formed between the first frame body and the second frame body, a side edge of the first display panel is disposed on a step surface, for forming the step, of the second frame body, and the fixing part is disposed on a step surface, for forming the step, of the first frame body; and the fixing part comprises a first groove, and a side edge of the touch base plate is disposed in the first groove; and the material of the fixing part comprises a sound absorption material.

Optionally, a density of the sound absorption material is greater than 0.01 g/cm$^3$.

Optionally, the piezoelectric unit is disposed on a light emitting side of the touch display panel; the touch display panel comprises a touch layer and a second display panel, and the touch layer and the second display panel are of an integrated structure.

Optionally, the touch display device further comprises a second frame and a first fixing unit, the first fixing unit is disposed on the second frame; and the first fixing unit comprises a second groove, a side edge of the touch display panel is disposed in the second groove; and the material of the first fixing unit comprises a sound absorption material.

Optionally, the touch display device further comprises a third frame and a second fixing unit, and the second fixing unit comprises a support sub-unit and a bonding sub-unit; and the support sub-unit is disposed on the third frame, the material of the support sub-unit comprises a sound absorption material, and the bonding sub-unit is disposed on a side edge of the touch display panel and is bonded with the support sub-unit.

In another aspect, a control method of the above haptic reproduction system is provided, comprising:

acquiring, by the touch driving unit, touch information, and transmitting the touch information to the upper computer;

sending, by the upper computer, a first waveform generation instruction to the waveform generator according to the touch information; and generating, by the waveform generator, a first waveform signal according to the first waveform generation instruction to enable the piezoelectric unit and the touch display panel to resonate.

Optionally, the touch display panel comprises an active area, and the active area comprises at least one active sub-area; and the touch information comprises touch coordinates;

sending, by the upper computer, a first waveform generation instruction to the waveform generator according to the touch information comprises:

determining, by the upper computer, the active sub-area to which the touch coordinates belong; and sending, by the upper computer, the first waveform generation instruction corresponding to the active sub-area, to which the touch coordinates belong, to the waveform generator.

Optionally, the touch information further comprises a touch time;

after the step of sending, by the upper computer, the first waveform generation instruction corresponding to the active sub-area, to which the touch coordinates belong, to the waveform generator, the method further comprises:

determining, by the upper computer, whether the touch coordinates change within the touch time; and if not, enabling the upper computer to stop sending the first waveform generation instruction corresponding to the active sub-area, to which the touch coordinates belong, to the waveform generator.

The aforesaid description is merely a brief summary of the technical solution of the present disclosure. To allow those skilled in the art to gain a better understanding of the technical means of the present disclosure so as to implement the present disclosure according to the contents in the specification and to make the above and other purposes, features and advantages of the present disclosure clearer, specific implementations of the present disclosure are given below.

BRIEF DESCRIPTION OF THE DRAWINGS

To more clearly explain the technical solutions of the embodiments of the present disclosure or the prior art, drawings used for describing the embodiments of the present disclosure or the prior art will be briefly introduced below. Obviously, the drawings in the following description only illustrate some embodiments of the present disclosure, and those ordinarily skilled in the art can obtain other drawings according to the following ones without creative labor.

DETAILED DESCRIPTION

To clarify the purposes, technical solutions and advantages of the embodiments of the present disclosure, the technical solutions of the embodiments of the present disclosure will be clearly and completely described below in conjunction with the drawings of the embodiments of the present disclosure. Obviously, the embodiments in the following description are merely illustrative ones, and are not all possible ones of the present disclosure. All other embodiments obtained by those ordinarily skilled in the art based on the following ones without creative labor should also fall within the protection scope of the present disclosure.

In the embodiments of the present disclosure, terms such as "first" and "second" are used to distinguish identical or similar elements with basically the same function and effect merely for the purposes of clearly describing the technical solutions of the embodiments of the present disclosure, and should not be construed as indicating or implying relative importance or implicitly indicating the number of technical features referred to. In addition, "multiple" refers to two or more, and "at least one" refers to one or more, unless otherwise specifically defined.

Terms such as "upper" and "lower" in the embodiments of the present disclosure are used to indicate directional or positional relations based on the accompanying drawings merely for the purpose of facilitating and simplifying the description, do not indicate or imply devices or elements referred to must be in a specific direction, or be configured and operated in a specific direction, and thus should not be construed as limitations of the present disclosure.

Figure 1:
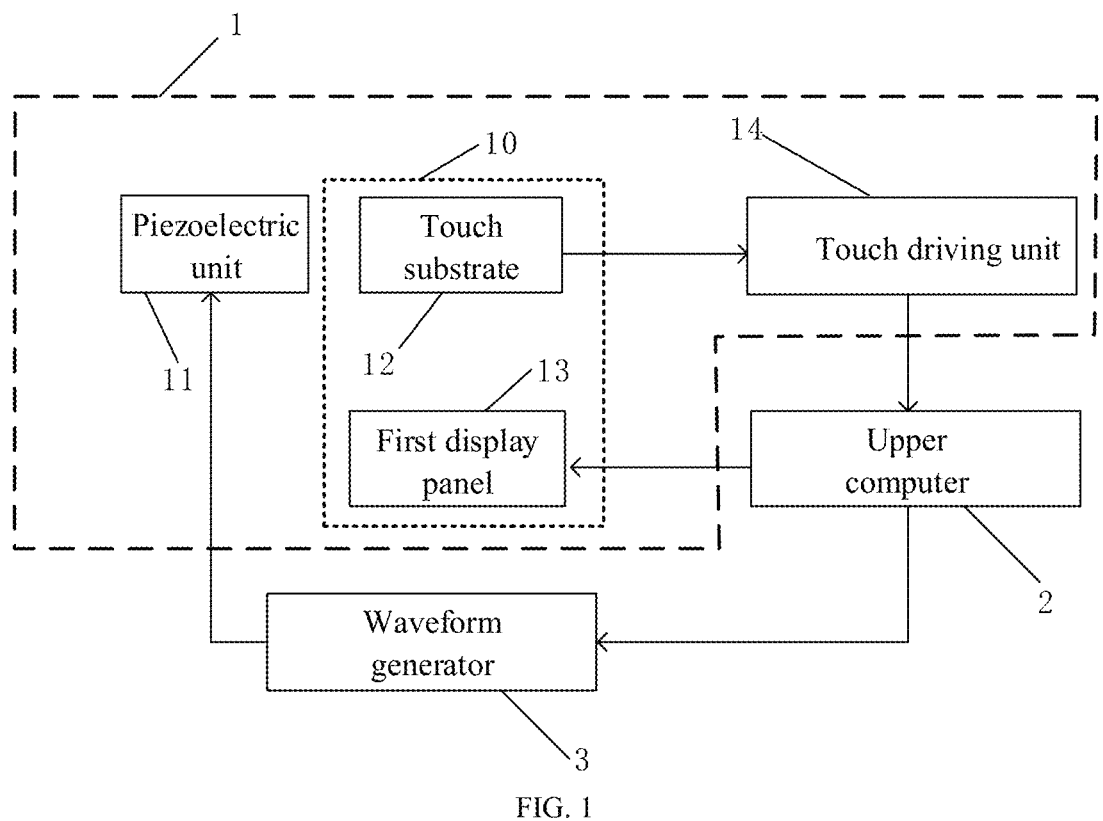
FIG. 1 illustrates a structural diagram of one haptic reproduction system.

One embodiment of the present disclosure provides a haptic reproduction system which, as shown in FIG. 1, comprises: a touch display device 1, an upper computer 2 and a waveform generator 3.

Wherein, as shown in FIG. 1, the touch display device 1 comprises a piezoelectric unit 11, a touch display panel 10 and a touch driving unit 14, and the piezoelectric unit is disposed on the touch display panel.

As shown in FIG. 1, the touch driving unit 14 is electrically connected to the touch display panel 10 and the upper computer 2, and is configured to acquire touch information and transmit the touch information to the upper computer. The upper computer 2 is electrically connected to the waveform generator 3, and is configured to send a first waveform generation instruction to the waveform generator according to the touch information. The waveform generator is configured to generate a first waveform signal according to the first waveform generation instruction. The piezoelectric unit 11 is electrically connected to the waveform generator 3, and is configured to resonate with the touch display panel under the drive of the first waveform signal to change the friction on a touch surface of the touch display device.

Figure 2A:
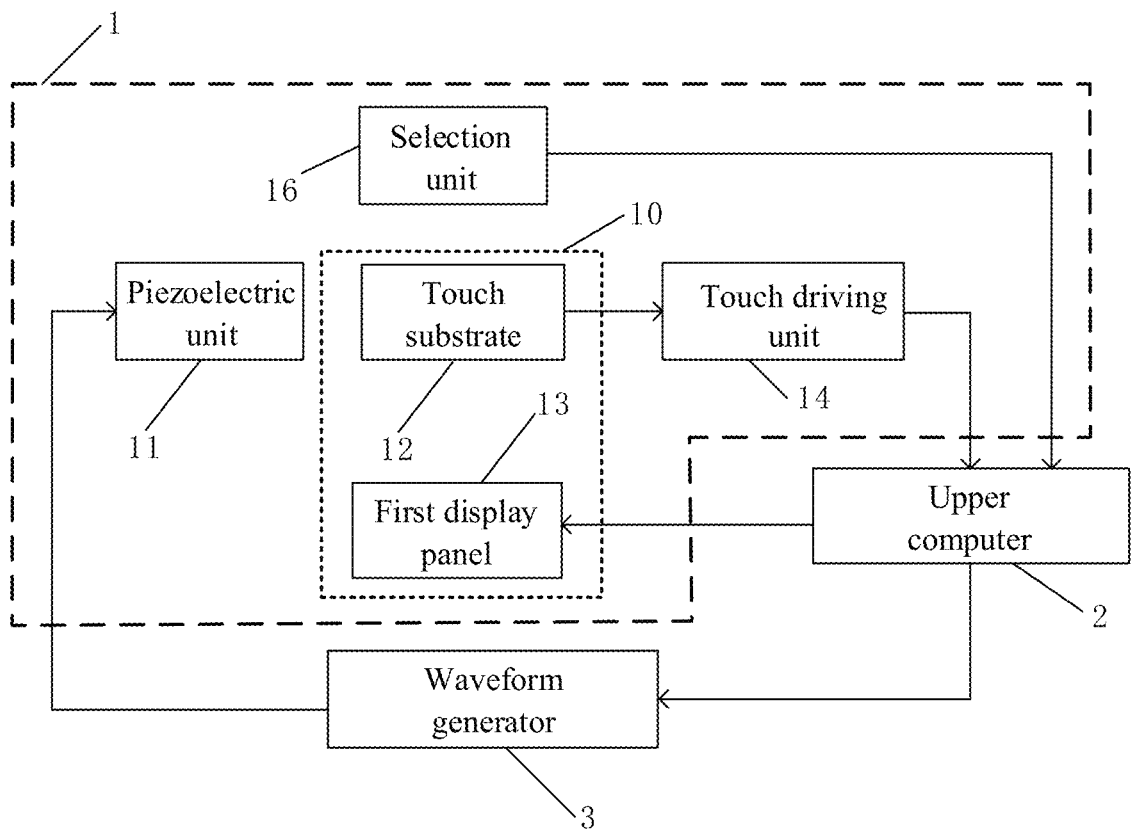
FIG. 2a illustrates a structural diagram of another haptic reproduction system.
Figure 2B:
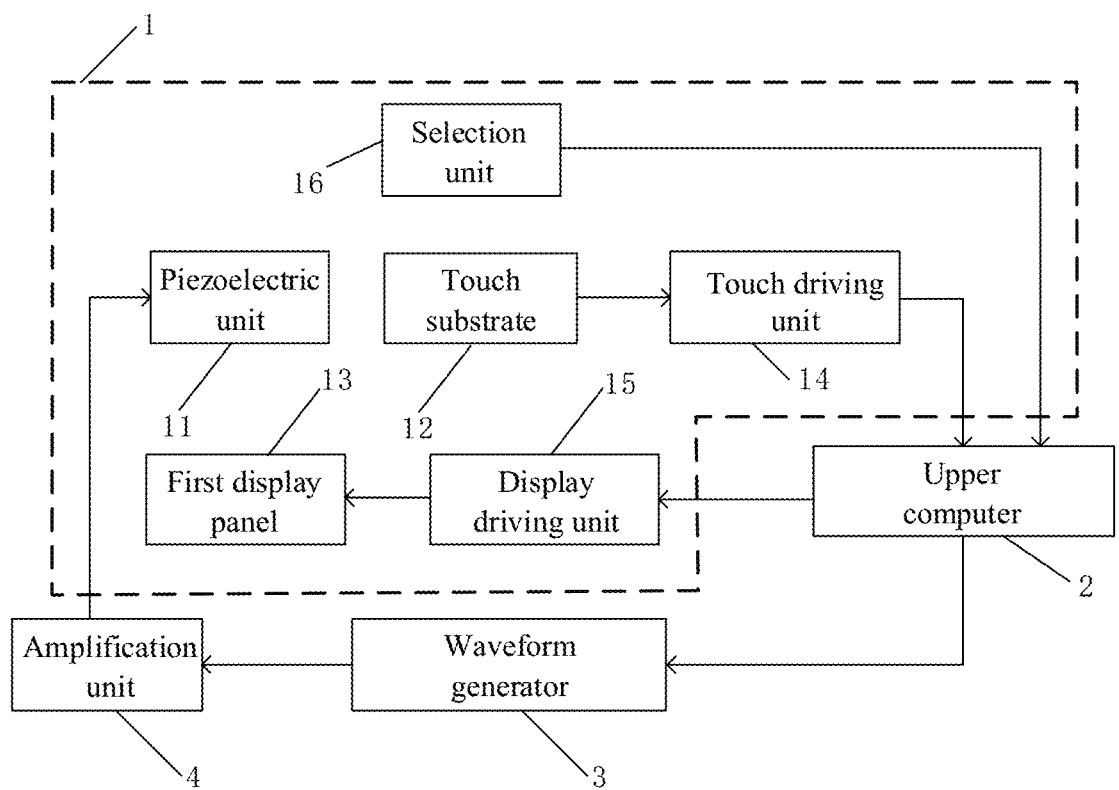
FIG. 2b illustrates a structural diagram of another haptic reproduction system.

The specific structure of the touch display panel is not limited. The touch display panel may be an on-cell touch display panel, and may illustratively comprise a touch base plate 12 and a first display panel 13 shown in FIG. 1, the piezoelectric unit and the touch base plate may be disposed on a light emitting side of the first display panel, the piezoelectric unit may be disposed on a side, away from or close to the first display panel, of the touch base plate, the touch driving unit may be electrically connected to the touch base plate. In this structure, the touch base plate of the touch display panel will be driven to resonate when the piezoelectric unit vibrates. In FIG. 1, FIG. 2a and FIG. 2b, the touch display panel 10 comprises the touch base plate 12 and the first display panel 13 by way of example.

Or, the touch display panel may comprise a touch layer and a second display panel, wherein the touch layer and the second display panel are of an integrated structure, the piezoelectric unit may be disposed on a light emitting side of the touch display panel. Illustratively, if the second display panel is an LCD display panel, the second display panel may comprise a cassette color film substrate and an array substrate, piezoelectric unit may be disposed on a light emitting side of the color film substrate, and the touch layer may be integrated on the array substrate. In this structure, the color film substrate of the touch display panel will be driven to resonate when the piezoelectric unit vibrates. If the second display panel is an OLED display panel, the second display panel may comprise a display substrate and a cover, the piezoelectric unit may be disposed on a light emitting side of the cover, and the touch layer may be integrated on the display substrate. In this structure, the cover of the touch display panel will be driven to resonate when the piezoelectric unit vibrates. The upper computer may be an electronic device such as a tablet personal computer or a computer, and the present disclosure has no limitation in this aspect. The type of the waveform generator is not limited either, and the waveform generator may be an FPGA (Field Programmable Gate Array) waveform generator, a signal generator, or the like.

In the touch display device, the type, number, structure and arrangement of the piezoelectric unit are not limited. Illustratively, the piezoelectric unit may comprise multiple piezoelectric patches. Or, the piezoelectric unit may comprise a PZT (Piezoelectric Ceramics) film, and in this case, the PZT film and the touch base plate may be integrated on-chip. The touch base plate may adopt a self-capacitive touch mode or a mutual-capacitive touch mode, and the present disclosure has no limitation in this aspect. The touch driving unit may comprise an MCU chip, an ARM (Advanced RISC Machines) chip, a DSP (Digital Signal Processing) chip, an FPGA chip, or the like, and the present disclosure has no limitation in this aspect.

The touch display device may be an LCD touch display device of a TN (Twisted Nematic) type, a VA (Vertical Alignment) type, an IPS (In-plane Aswitching) type or an ADS (Advanced Super Dimension Switch) type, an OLED (Organic Light-Emitting Diode) touch display device, a Micro LED touch display device, or a Mini LED touch display device, which depends on actual requirements. The touch display device may be any products or components comprising the display device and having a display function such as televisions, digital cameras, mobile phones, and tablet personal computers.

The touch information acquired by the touch driving unit may include touch coordinates, touch time, and the like, and the present disclosure has no limitation in this aspect. The first waveform signal generated by the waveform generator may be a continuous waveform such as a sine wave or a cosine wave, or a pulse waveform such as a rectangular wave, a sawtooth wave or a triangular wave.

The piezoelectric unit has a piezoelectric effect (piezoelectric property) which is a direct piezoelectric effect or an inverse piezoelectric effect. When a piezoelectric material deforms under the effect of an external force, electric charges with opposite polarities will be generated on both surfaces of the piezoelectric material, and this phenomenon is called the direct piezoelectric effect. On the contrary, when an electric field is applied to the piezoelectric material, the piezoelectric material will vibrate telescopically to deform, and this phenomenon is called the inverse piezoelectric effect. Based on the inverse piezoelectric effect, a signal is applied to the piezoelectric unit of the haptic reproduction system to generate an electric field, and under the effect of the electric field, the piezoelectric unit drives the touch display panel to vibrate at the ultrasonic frequency, such that the piezoelectric unit and the touch display panel resonate; and when users touch the touch surface of the touch display device with their fingers, because the touch display panel and the piezoelectric unit are in the vibrating state, an air squeeze film effect will be generated between the fingers and the touch surface, that is, an air film is generated between the fingers and the touch surface to reduce the positive pressure between the fingers and the touch surface, such that the friction between the fingers and the touch surface is reduced, the users may feel the change of the friction when sliding their fingers on the touch surface, and finally, texture representation is realized.

According to the haptic reproduction system in this embodiment of the present disclosure, when users slide their fingers on the touch surface of the touch display device, the piezoelectric vibrates under the combined action of the touch driving unit, the upper computer and the waveform generator, and drives the touch display panel to resonate, such that an air film is generated between the fingers and the touch surface, the fingers of the users may perceive the change of the friction based on the squeeze film effect, and the users have a feeling of touching different textures, that is, the haptic reproduction system fulfills a haptic reproduction function.

Optionally, the touch display panel comprises an active area, and the active area comprises at least one active sub-area.

The touch information includes touch coordinates. The upper computer is also configured to determine the active sub-area to which the touch coordinates belong and send a first waveform generation instruction corresponding to the active sub-area, to which the touch coordinates belong, to the waveform generator.

It should be noted that a corresponding relationship between the active sub-areas and the first waveform generation instructions may be pre-stored in the upper computer. The first waveform generation instructions corresponding to the active sub-areas may be identical or different. To provide a richer haptic reproduction effect, the former is preferred. Illustratively, the active area comprises three active sub-areas which are named an area A, an area B and an area C, respectively; the first waveform generation instruction corresponding to the area A may be an instruction enabling the waveform generator to generate a continuous waveform, the first waveform generation instruction corresponding to the area B may be an instruction enabling the waveform generator to generate a pulse waveform with a first cycle, and the first waveform instruction corresponding to the area C may be an instruction enabling the waveform generator to generate a pulse waveform with a second cycle, wherein the first cycle is different from the second cycle. In this way, the users may perceive three different textures when sliding their fingers in the area A, the area B and the area C.

Based on the corresponding relationship between the active sub-areas and the first waveform generation instructions, the upper computer is able to send the corresponding first waveform generation instruction to the waveform generator by determining the active sub-area to which the touch coordinates belong, such that the development difficulty is greatly lowered, and the development time and cost are saved.

Optionally, the touch information further includes a touch time.

The upper computer is also configured to determine whether the touch coordinates change within the touch time; if not, the upper computer stops sending the first waveform generation instruction corresponding to the active sub-area, to which the touch coordinates belong, to the waveform generator.

It should be noted that whether the fingers of users stop sliding may be determined by determining whether the touch coordinates change within the touch time. Illustratively, if the touch coordinates do not change within the touch time, it indicates that the fingers of the users stop sliding; or, if the touch coordinates change within the touch time, it indicates that the fingers of the users are sliding.

Under the condition that the touch coordinates do not change within the touch time (that is, the fingers of the users stop sliding), the upper computer stops sending the first waveform generation instruction corresponding to the active sub-area, to which the touch coordinates belong, to the waveform generator, such that power consumption is reduced, and the working time of the device is prolonged.

Optionally, as shown in FIG. 2a, the touch display device 1 further comprises at least one selection unit 16. The selection unit 16 is electrically connected to the upper computer 2, and is configured to provide a selection function and transmit selection information to the upper computer. The upper computer is also configured to send a second waveform generation instruction to the waveform generator according to the selection information. The waveform generator is also configured to generate a second waveform signal according to the second waveform generation instruction. The piezoelectric unit is also configured to resonate with the touch display panel under the drive of the second waveform signal.

The selection unit may comprise a key, a switch, and the like, and is used to provide a selection function for users. The users may select any one selection unit and then slide their fingers on the touch surface of the touch display device to obtain a texture touch feeling.

It should be noted that a corresponding relationship between the selection units and the second waveform generation instructions may be pre-stored in the upper computer. The second waveform generation instructions corresponding to the selection units may be identical or different. To provide a richer haptic reproduction effect, the later is preferred. Illustratively, the touch display device comprises three selection units which are named a selection unit A, a selection unit B and a selection unit C, respectively; the second waveform generation instruction corresponding to the selection unit A may be an instruction enabling the waveform generator to generate a continuous waveform, the second waveform generation instruction corresponding to the selection unit B may be an instruction enabling the waveform generator to generate a pulse waveform with a first cycle, and the second waveform generation instruction corresponding to the selection unit C is an instruction enabling the waveform generator to generate a pulse waveform with a second cycle, wherein the first cycle is different from the second cycle. In this way, after selecting the selection unit A, the selection unit B and the selection unit C, the users may perceive three different textures when sliding their fingers on the touch surface of the touch display device.

Based on the corresponding relationship between the selection units and the second waveform generation instructions, the upper computer is able to send the corresponding second waveform instruction to the waveform generator by determining the specific selection unit according to the selection information, the touch driving unit does not need to acquire the touch information, the upper computer does not need to determine the touch information, and this is another method for sending waveform instructions to the upper computer.

The haptic reproduction system provides two operation methods for users. According to one method, the users directly slide their fingers on the touch surface of the touch display device. According to the other method, the users select one selection unit first and then slide their fingers on the touch surface of the touch display device. Both methods allow the users to obtain a texture touch feeling. The haptic reproduction system has diversified functions and is high in selectivity.

Optionally, the touch display panel comprises an active area, and the active area comprises at least one active sub-area.

The selection unit corresponds to at least one active sub-area. The upper computer is also configured to determine an active sub-area selected by a user according to the selection information and send a second waveform generation instruction corresponding to the active sub-area selected by the user to the waveform generator.

It should be noted that a corresponding relationship between the selection units and the active sub-areas may be pre-stored in the upper computer. The selection unit may correspond to all the active sub-areas (that is, the selection unit corresponds to all the whole active area of the touch display device), and in this case, if users select one selection unit, the fingers of the users may obtain a texture touch feeling on the touch surface in the whole active area. Or, the selection unit may correspond to part of the active sub-areas, and in this case, if the users select one selection unit, the fingers of the users may obtain a texture touch feeling on the touch surface in the part of active sub-areas corresponding to the selection unit.

Based on the corresponding relationship between the selection units and the active sub-areas and the corresponding relationship between the selection units and the second waveform generation instructions, users may feel different textures on the touch surface at different positions of the active area by selecting different selection units, such that the haptic reproduction effect of the haptic reproduction system is further improved.

Optionally, as shown in FIG. 2b, the touch display device 1 further comprises a display driving unit 15 electrically connected to the first display panel 13 and the upper computer 2.

The upper computer is also configured to send an image display instruction to the display driving unit according to the touch information, and the display driving unit is configured to generate an image signal according to the image display instruction to enable the touch display panel to display an image.

It should be noted that a corresponding relationship between the image display instructions and the first waveform generation instructions may be pre-stored in the upper computer. Of course, if the touch display device comprises at least one selection unit, a corresponding relationship between the image display instructions and the second waveform generation instructions may also be pre-stored in the upper computer. In this way, the users may feel textures with their fingers and see images corresponding to the textures with their eyes when sliding their fingers on the touch surface of the touch display device, such that user experience is greatly improved.

The display driving unit and the touch driving unit are arranged separately, or are integrated, and the present disclosure has no limitation in this aspect. The display driving unit may comprise an MCU chip, an ARM (Advanced RISC Machines) chip, a DSP (Digital Signal Processing) chip, an FPGA chip, or the like, which depends on actual requirements.

Through the coordination of the display driving unit and the upper computer, users may obtain a texture touch feeling and a visual effect, and thus, user experience is greatly improved.

Signals generated by common waveform generators are weak and need to be amplified to be used to drive the piezoelectric unit. Optionally, as shown in FIG. 2b, the haptic reproduction system further comprises an amplification unit 4 which is able to amplify waveform signals generated by the waveform generator.

As shown in FIG. 2b, the amplification unit 4 is electrically connected to the waveform generator 3 and the piezoelectric unit 11, and is configured to amplify the first waveform generation signal; and the piezoelectric unit is also configured to resonate with the touch display panel under the drive of the amplified first waveform generation signal.

The amplification unit comprises an amplifier, and the specific type of the amplifier is not limited here.

Of course, if the touch display device further comprises at least one selection unit, the amplification unit is also configured to amplify the second waveform generation signal, and the piezoelectric unit is also configured to resonate with the touch display panel under the drive of the amplified second waveform generation signal.

Optionally, the amplification unit comprises an amplifier; the waveform generator is an FPGA waveform generator, which is able to generate multiple waveforms and has a wide application range. If the haptic reproduction system adopts the FPGA waveform generator, the upper computer may be electrically connected to the FPGA waveform generator by means of a network cable and be communicated with the FPGA waveform generator by means of a UDP (User Datagram Protocol).

Figure 11:
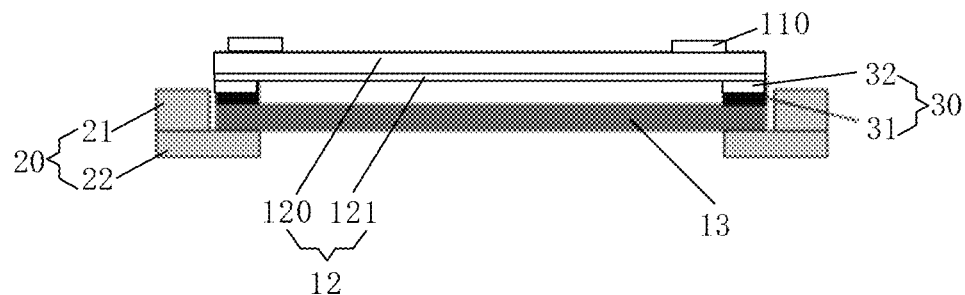
FIG. 11 illustrates a structural diagram of a second touch display device.

Optionally, as shown in FIG. 11, the touch display panel comprises a touch base plate 12 and a first display panel 13, wherein the touch base plate 12 is disposed on a light emitting side of the first display panel 13, and the piezoelectric unit is disposed on a side, close to or away from the first display panel, of the touch base plate. In FIG. 11, the piezoelectric unit comprises piezoelectric patches 110 which are disposed on a side, away from the first display panel 13, of the touch base plate 12, by way of example.

Figure 3A:
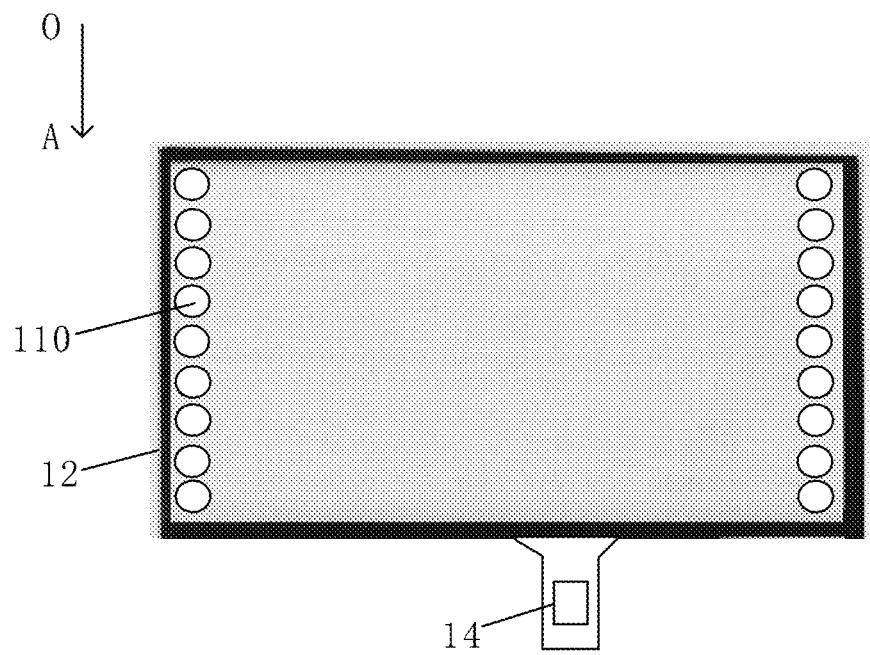
FIG. 3a illustrates a structural diagram of a piezoelectric unit and a touch base plate.
Figure 3B:
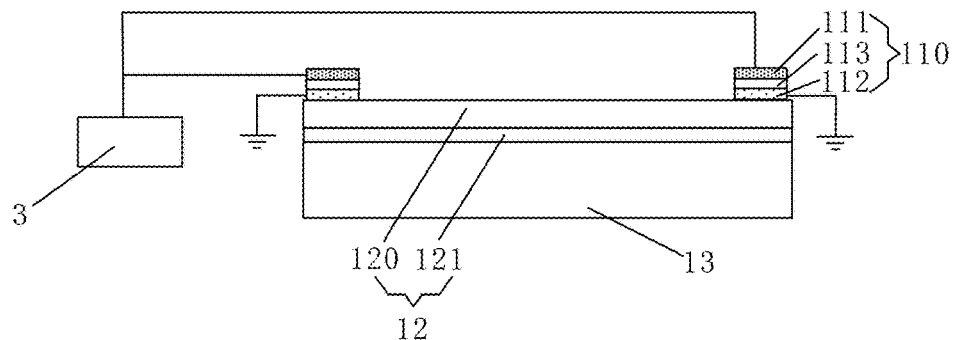
FIG. 3b illustrates a structural diagram of a piezoelectric unit and a touch display panel.

Optionally, to simplify the structure and facilitate implementation, the piezoelectric unit comprises multiple piezoelectric patches 110 shown in FIG. 3a. As shown in FIG. 3b, each piezoelectric patch 110 comprises a piezoelectric layer 113, and a first electrode 111 and a second electrode 112 located on two opposite sides of the piezoelectric layer 113.

As shown in FIG. 3b, the touch base plate 12 comprises a substrate 12 and a touch layer 121, wherein the touch layer 121 is disposed on a side, close to the first display panel 13, of the substrate 120, and the multiple piezoelectric patches 110 are arranged on a side, away from the touch layer 121, of the substrate 120.

As shown in FIG. 3b, the first electrodes 111 of the multiple piezoelectric patches 110 are all grounded, and the second electrodes 112 of the multiple piezoelectric patches 110 are all electrically connected to the waveform generator 3.

The arrangement of the multiple piezoelectric patches is not limited. The piezoelectric layers of the piezoelectric patches may be made of ceramic, the first electrodes and the second electrodes of the piezoelectric patches may be made of an electrically conductive material, which may be a transparent metal oxide such as ITO (Indium Tin Oxide) or AZO, or be a non-transparent metal such as gold, silver, copper or aluminum. To reduce the influence on the display effect of the display panel, the first electrodes and the second electrodes may be made of the transparent metal oxide. Of course, the first electrodes and the second electrodes may also be made of common metal materials such as Au (gold) and In (indium). Considering that light may be unable to penetrate through the electrodes if the metal material is too thick, the thickness of the first electrodes and the second electrodes is set to be less than or equal to 20 nm when the electrodes are made of the metal material.

The substrate of the touch base plate may be made of a rigid material such as glass, such that the piezoelectric patches are able to better drive the touch base plate to vibrate. The touch layer is disposed on a side, close to the first display panel, of the substrate, and is protected by the substrate against scratches, such that the product quality is improved.

To avoid the influence of the piezoelectric patches on the touch effect, the piezoelectric patches may avoid an effective touch line in the touch layer.

Optionally, the touch display panel comprises an active area, and the active area comprises at least one active sub-area; and the same waveform signal is accessed to the second electrodes of the piezoelectric patches located in the same active sub-area.

Because the same waveform signal is accessed to the second electrodes of the piezoelectric patches in the same active sub-area, the figures of users may perceive the same texture in this sub-area, such that the structure is further simplified, and the drive difficulty is lowered. If different waveform signals are accessed to the second electrodes of the piezoelectric patches in different active sub-areas, different textures will be generated in different active sub-areas.

Optionally, as shown in FIG. 3a, the multiple piezoelectric patches 110 are divided into two groups that are disposed on opposite sides of the touch base plate 12 respectively in a first direction (OA direction in FIG. 3a). In FIG. 3a, the first direction is a short-side direction of the touch base plate. Of course, the first direction may be a long-side direction of the touch base plate, and the present disclosure has no limitation in this aspect.

Figure 4:
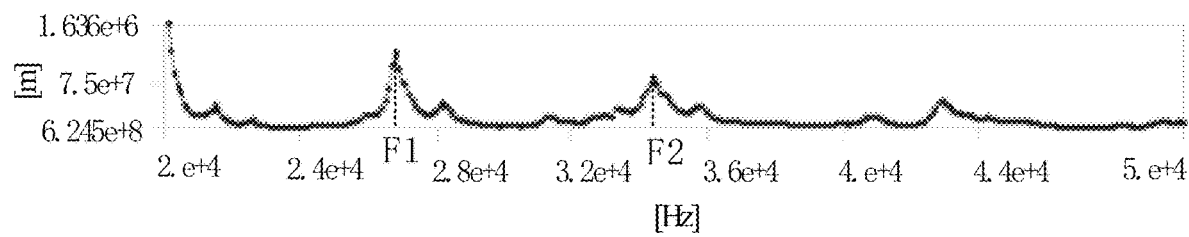
FIG. 4 illustrates a schematic diagram of the amplitude and frequency.
Figure 5:
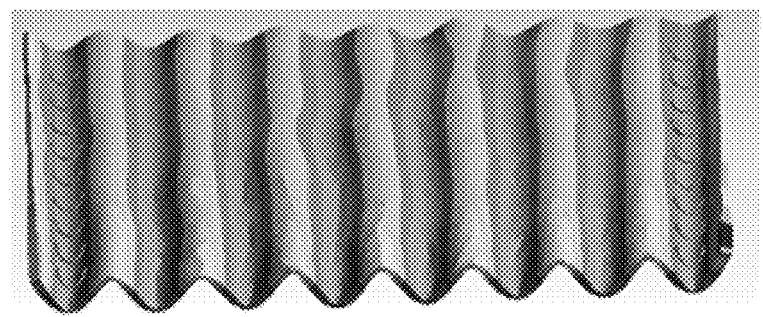
FIG. 5 illustrates one vibration simulation diagram.
Figure 6:
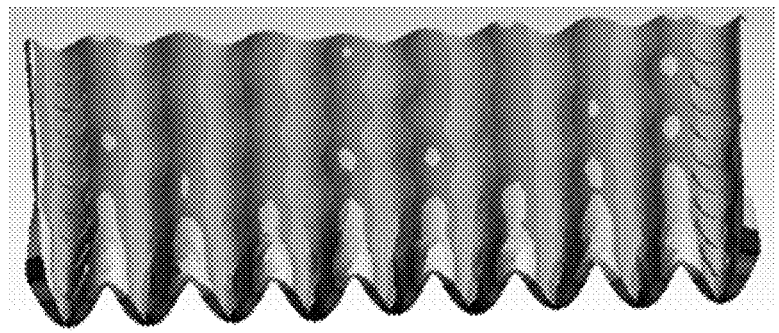
FIG. 6 illustrates another vibration simulation diagram.
Figure 7:
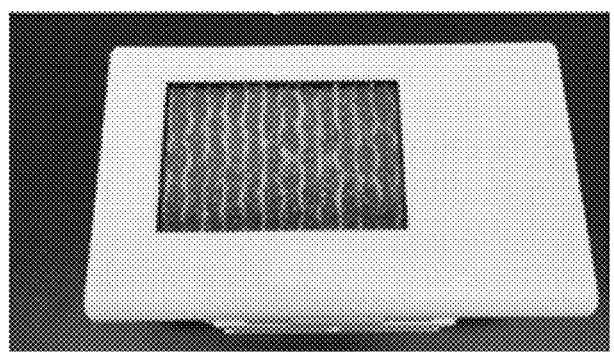
FIG. 7 illustrates a diagram of the result of a salt test.

The piezoelectric patches and the touch base plate in FIG. 3a are simulated with finite elements to obtain the vibration mode and resonant frequency point of the combination of the piezoelectric patches and the touch base plate by calculation, and an amplitude and frequency diagram of the combination is shown in FIG. 4. When the vibration frequency of the combination is F1 (about 26.4 kHz) shown in FIG. 4, a corresponding vibration simulation diagram is illustrated by FIG. 5. When the vibration frequency of the combination is F2 (about 34 kHz) shown in FIG. 4, a corresponding vibration simulation diagram is illustrated by FIG. 5. It can be known, by an actual electric and salt test, that the resonant frequency point is identical with a theoretical simulation result. FIG. 7 illustrates a diagram of the result of a salt test.

Figure 8A:
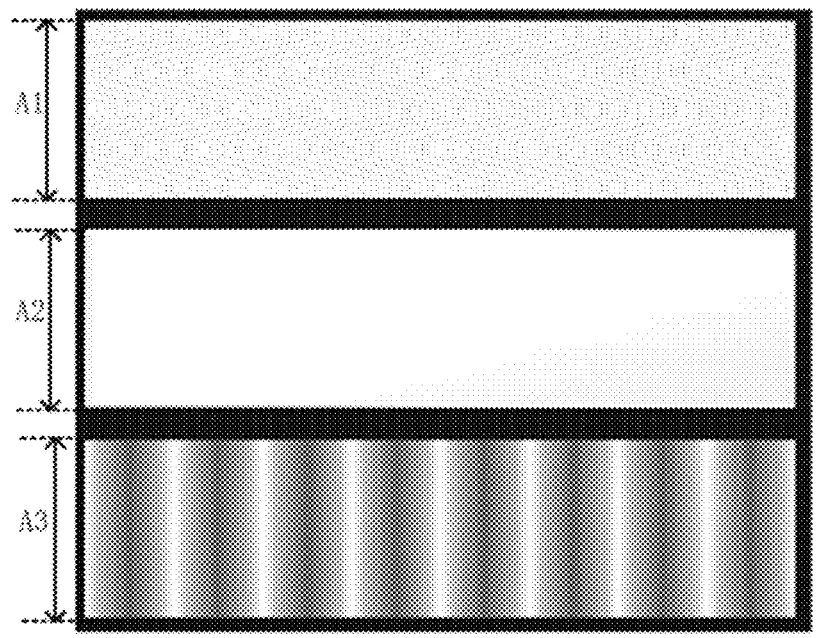
FIG. 8a illustrates an implementation effect diagram of one touch display device.
Figure 8B:
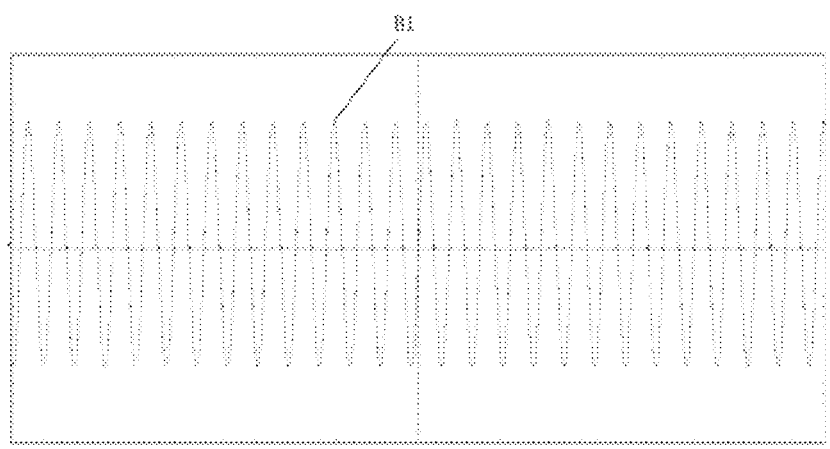
FIG. 8b a illustrates a diagram of a continuous waveform.
Figure 8C:
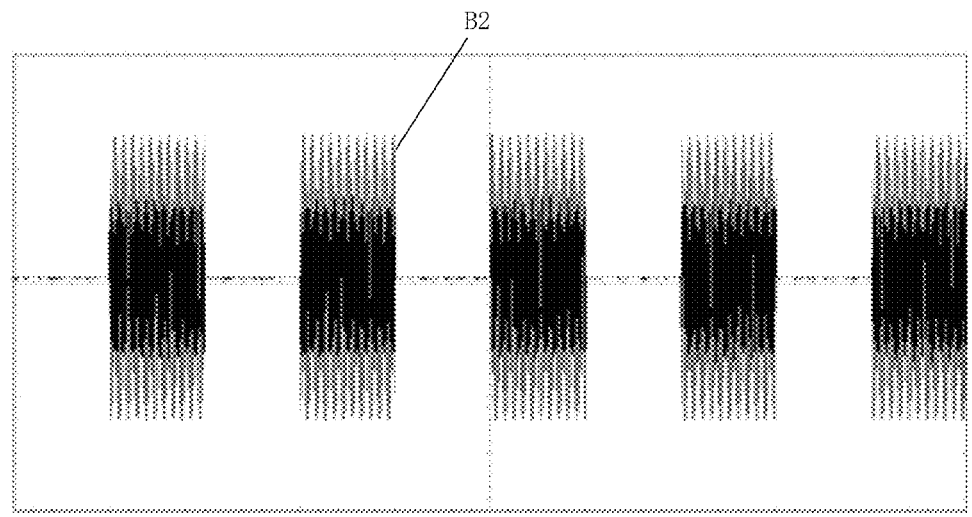
FIG. 8c a illustrates a diagram of a pulse waveform.
Figure 9:
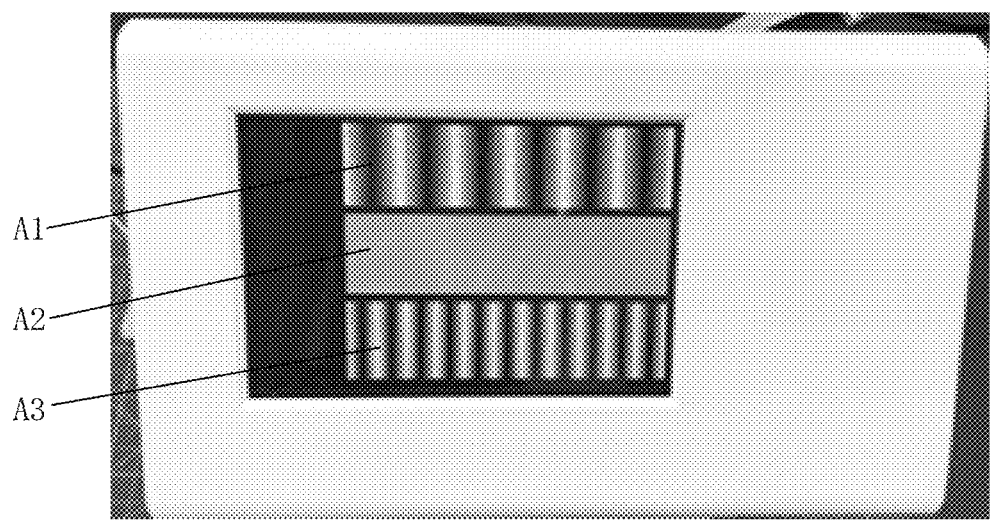
FIG. 9 illustrates an implementation effect diagram of another touch display device.

The implementation effect of the system is described with the case where the active area comprises three active sub-areas and the same waveform signal is accessed to the second electrodes of the piezoelectric patches located in the same active sub-area. As shown in FIG. 8a, in the touch display device, a stimulus waveform corresponding to the piezoelectric patches in an active sub-area A1 is a continuous waveform B1 illustrated by FIG. 8b, and a perception effect diagram conceptually described by the continuous waveform includes multiple waves, that is, the users may feel a wavy texture when moving their fingers in the active sub-area A1. No stimulus waveform is applied to the piezoelectric patches in the active sub-area A2, so the users only feel the texture of the touch surface when sliding their fingers in the active sub-area A2. The stimulus waveform corresponding the piezoelectric patches in the active sub-area A3 is a pulse waveform B2 illustrated by FIG. 8c, so the users may feel multiple protrusions spaced from each other when sliding their fingers in the active sub-area A3. Wherein, the continuous waveform B1 may be a continuous sine wave with a frequency of 26.4 kHz, such that a smooth feeling may be created when the fingers of the users slide in the active sub-area A1. The pulse waveform B2 may be a pulse waveform with a frequency of 5-20 Hz and a carrier wave of 26.4 kHz, such that a sense of vibration may be created while a smooth feeling is created, and the experience effect is better. FIG. 9 illustrates another implementation effect. In FIG. 9, the stimulus waveforms corresponding to the piezoelectric patches in the active sub-area A1 and the piezoelectric patches in the active sub-area A3 are pulse waveforms with different cycles, and the stimulus waveform corresponding the piezoelectric patches in the active sub-area A2 is a continuous waveform.

Figure 10:
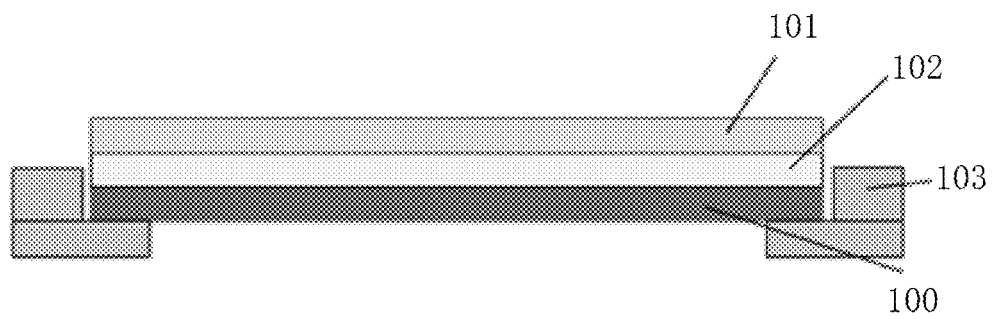
FIG. 10 illustrates a structural diagram of a first touch display device.

As shown in FIG. 10, the touch display device comprises a display screen 100 and a touch screen 101, wherein the touch screen comprises cover glass (CG) and a capacitive touch layer disposed on the cover glass, and the touch screen 101 is attached to the display screen 100 with an optically clear adhesive (OCA) 102. If the touch display device is used for realizing haptic reproduction, the touch display device may further comprise a piezoelectric device (not shown in FIG. 10), wherein the piezoelectric device is disposed on a side, away from or close to the display screen, of the capacitive touch layer. Of course, the touch display device may further comprise a bracket 103, wherein the bracket may be a plastic bracket or a metal bracket (such as an aluminum frame) used for supporting the display screen 100 and the touch screen 101. When the touch display device is used for realizing haptic reproduction, the cover glass is able to vibrate structurally. By adoption of the optically clear adhesive, the vibrations of the cover glass will be restrained to a great extent, thus compromising the haptic reproduction effect. Moreover, the cover glass may vibrate in an axial direction (direction parallel to the cover glass) in the vibrating process and rub with the bracket to generate high-frequency noises, thus affecting user experience.

Optionally, to guarantee sufficient vibrations of the touch base plate to fulfill a better haptic reproduction effect, the touch display device further comprises a fixing part configured to fix the touch base plate and reserve a gap between the touch base plate and the first display panel.

The gap may be filled with air, nitrogen, hydrogen, or the like, and the present disclosure has no limitation in this aspect. The specific structure of the fixing part is not limited.

The gap is reserved between the touch base plate and the first display panel, such that a sufficient vibration space is provided for the touch base plate, and the vibration effect of the touch base plate is guaranteed.

If the gap between the touch base plate and the first display panel is too narrow, the vibration effect cannot be guaranteed. If the gap between the touch base plate and the first display panel is too large, the size of the device will be increased. To avoid these too situations, the size of the gap in a direction perpendicular to a plane where the substrate is located is optionally greater than 2 μm, and is preferably 2-100 μm, and the specific value depends on the actual circumstances.

One structure of the fixing part is provided below. As shown in FIG. 11, the fixing part 30 comprises a support part 31 and a bonding part 32, wherein the support part 31 is disposed on a side edge of the first display panel 13 and is made a sound absorption material, and the bonding part 32 is disposed on a side, away from the first display panel 13, of the support part 31, and is bonded on the touch base plate 12.

To prevent vibrations from being affected by the bonding part, the bonding part is made of silicone, the Young modulus of which is less than 0.1 MPa. If the thickness of the silicone is greater than 10 μm, a better fixing effect will be realized; and the size of the gap between the touch base plate and the first display panel is further increased to prevent the vibrations from being affected.

To reduce noises and improve user experience, the density of the sound absorption material is greater than 0.01 g/cm³. The specific type of the sound absorption material is not limited here. For example, it is found, by study, that the noise value measured is greater than 40 dB when the density of an EVA (ethylene-vinyl acetate) sound absorption sponge is less than 0.01 g/cm³ (such as 0.120 g/cm³, 0.072 g/cm³, 0.036 g/cm³ and 0.024 g/cm³); and the noise value measured is less than 40 dB when the density of the EVA sound absorption sponge is greater than 0.01 g/cm³. Illustratively, when the density is 0.0108-0.0192 g/cm³, the noise value measured is 35-39 dB. Thus, to more effectively reduce noises, the support part is preferably made of a sound absorption material with a density greater than 0.01 g/cm³. In addition, the thickness of the support is not greater than 2 mm, such that noises may be further restrained and absorbed.

Figure 12:
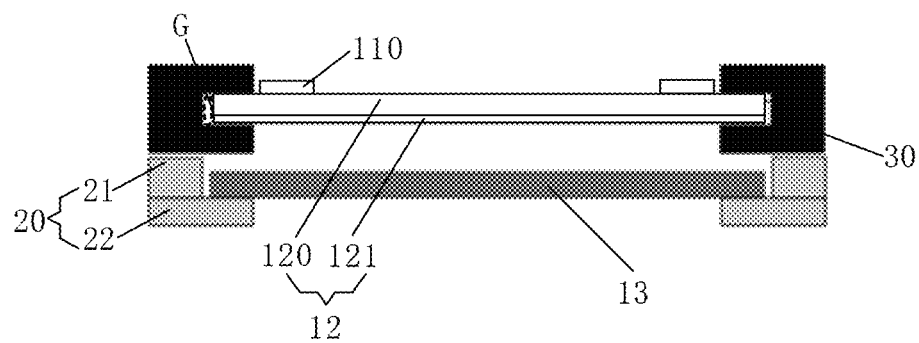
FIG. 12 illustrates a structural diagram of a third touch display device.
Figure 13:
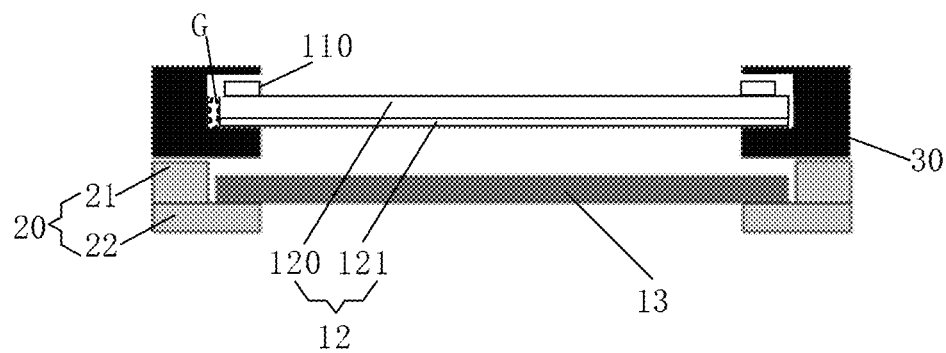
FIG. 13 illustrates a structural diagram of a fourth touch display device.

Another structure of the fixing part is provided below. As shown in FIG. 12 and FIG. 13, the touch display device further comprises a first frame 20. The first frame 20 comprises a first frame body 21 and a second frame body 22, a step is formed between the first fame body 21 and the second frame body 22, the side edge of the display panel 13 is disposed on a step surface, for forming the step, of the second frame body 22, and the fixing part 30 is disposed on a step surface, for forming the step, of the first frame body 21. The fixing part 30 comprises a first groove, and the side edge of the touch base plate 12 is disposed in the first groove. The fixing part is made of a sound absorption material.

The touch base plate is clamped by the fixing part to be supported and fixed. The side edge of the touch base plate is merely disposed in the groove of the fixing part and does not cling to the groove; and to prevent vibrations from being affected, a gap G is reserved between the touch base plate 12 and the bottom of the groove, as shown in FIG. 12, and the size of the gap in a direction parallel to the touch base plate is greater than 10 μm. In addition, as shown in FIG. 12, the piezoelectric patches 110 are not covered by the fixing part 30, such that light can penetrate through the piezoelectric patches 110. Or, as shown in FIG. 13, the piezoelectric patches 110 are covered by the fixing part 30, such that light cannot penetrate through the piezoelectric patches 110. To ensure that the piezoelectric patches are able to vibrate without being affected, the piezoelectric patches 110 do not contact with the fixing part 30, as shown in FIG. 12 and FIG. 13.

To further reduce noises and improve user experience, the fixing part may be made of a sound absorption material with a density greater than 0.01 g/cm³.

Figure 14:
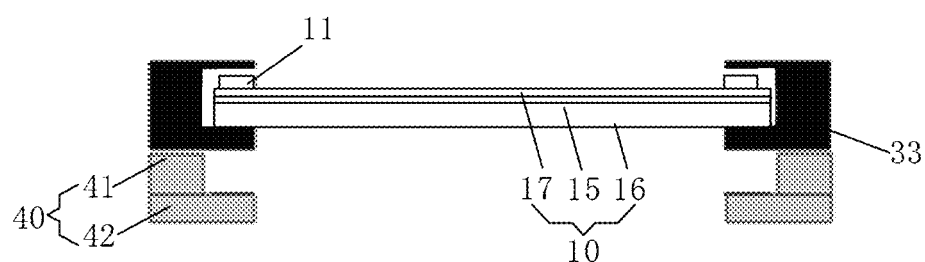
FIG. 14 illustrates a structural diagram of a fifth touch display device.
Figure 15:
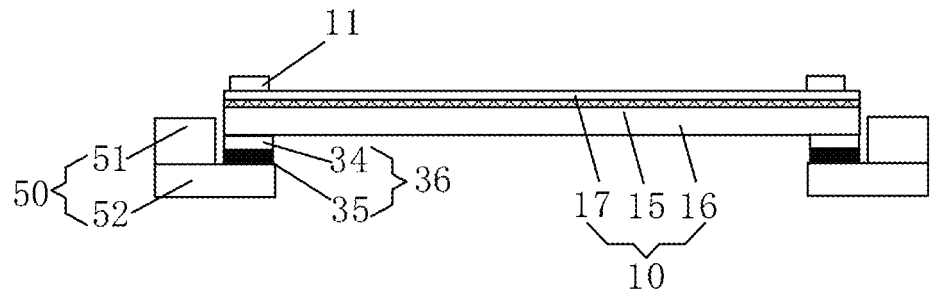
FIG. 15 illustrates a structural diagram of a sixth touch display device.

Optionally, as shown in FIG. 14 and FIG. 15, the piezoelectric unit 11 is disposed on a light emitting side of the touch display panel 10; and the touch display panel 10 comprises a touch layer 15 and a second display panel, and the touch layer and the second display panel are of an integrated structure. In FIG. 14 and FIG. 15, the second display panel comprises a cover 17 and a display substrate 16, and the touch layer 15 and the display substrate 16 are integrated. Or, the second display panel comprises a color film substrate and an array substrate, and the touch layer and the array substrate are integrated. The present disclosure has no limitation in this aspect.

Optionally, as shown in FIG. 14, the touch display device further comprises a second frame 40 and a first fixing unit 33 disposed on the second frame 40.

The first fixing unit 33 comprises a second groove (not shown in FIG. 14), and the side edge of the touch display panel 10 is disposed in the second groove; and the first fixing unit is made of a sound absorption material.

The structure of the second frame is not limited. Illustratively, as shown in FIG. 14, the second frame 40 may comprise a third frame body 41 and a fourth frame body 42, wherein a step is formed between the third frame body 41 and the fourth frame body 42, and the first fixing unit 33 is arranged on a step surface, for forming the step, of the third frame body 41, or is disposed on a step surface, for forming the step, of the fourth frame body. In FIG. 14, the first fixing unit is disposed on the step surface, for forming the step, of the third frame body 41.

The piezoelectric unit may not be covered by the first fixing unit, such that light can penetrate through the piezoelectric unit. Or, as shown in FIG. 14, the piezoelectric unit 11 is covered by the first fixing unit 33, such that light cannot penetrate through the piezoelectric unit 11. To ensure that the piezoelectric unit is able to vibrate without being affected, the piezoelectric unit 11 does not contact with the first fixing unit 33, as shown in FIG. 14.

Optionally, as shown in FIG. 15, the touch display device further comprises a third frame 50 and a second fixing unit 36, and the second fixing unit 36 comprises a support sub-unit 35 and a bonding sub-unit 34.

The support sub-unit 35 is disposed on the third frame 50 and is made of a sound absorption material, and the bonding sub-unit 34 is disposed on a side edge of the touch display panel 10 and is bonded with the support sub-unit 35.

The structure of the third frame is not limited. Illustratively, as shown in FIG. 15, the third frame 50 may comprise a fifth frame body 51 and a sixth frame body 52, wherein a step is formed between the fifth frame body 51 and the sixth frame body 52, and the support sub-unit 35 is disposed on a step surface, for forming the step, of the sixth frame body 52, or is disposed on a step surface, for forming the step, of the fifth frame body. In FIG. 15, the support sub-unit 35 is disposed on the step surface, for forming the step, of the sixth frame body 52.

It should be noted that the first fixing unit and the support sub-unit may be made of a sound absorption material with a density greater than 0.01 g/cm$^3$.

The haptic reproduction system may be applied to notebook computers, automotive control consoles, advertising boards, or other scenarios requiring touch interaction with fingers of users. When the haptic reproduction system is applied to a notebook computer, the touch display device is able to display a virtual keyboard, and users may feel different textures when touching the virtual board, such that traditional physical keyboards may be replaced.

One embodiment of the present disclosure further provides a control method of the haptic reproduction system, comprising:

S01: acquiring touch information by a touch driving unit, and sending the touch information to an upper computer;

S02: sending, by the upper computer, a first waveform generation instruction to a waveform generator according to the touch information; and S03: generating, by the waveform generator, a first waveform signal according to the first waveform generation instruction to enable a piezoelectric unit and a touch display panel to resonate.

By performing steps S01-S03, users may obtain a feeling of touching different textures when sliding their fingers on a touch surface of a touch display device, that is, haptic reproduction is realized.

Optionally, the touch display panel comprises an active area, and the active area comprises at least one active sub-area; and the touch information includes touch coordinates.

S02: sending, by the upper computer, a first waveform generation instruction to a waveform generator according to the touch information comprises:

S021: determining, by the upper computer, the active sub-area to which the touch coordinates belong; and S022: sending, by the upper computer, the first waveform generation instruction corresponding to the active sub-area, to which the touch coordinates belong, to the waveform generator.

Based on a corresponding relationship between the active sub-areas and the first waveform generation instructions, the upper computer is able to send the corresponding first waveform generation instruction to the waveform generator by determining the active sub-area to which the touch coordinates belong, such that the development difficulty is greatly lowered, and the development time and cost are saved.

Optionally, the touch information further includes a touch time.

After S022: sending, by the upper computer, the first waveform generation instruction corresponding to the active sub-area, to which the touch coordinates belong, to the waveform generator, the method further comprises:

S04: determining, by the upper computer, whether the touch coordinates change within the touch time; and S05: if not, enabling the upper computer to stop sending the first waveform generation instruction corresponding to the active sub-area, to which the touch coordinates belong, to the waveform generator.

It should be noted that whether or not the fingers of the users stop sliding may be determined by determining whether the touch coordinates change within the touch time. Illustratively, if the touch coordinates do not change within the touch time, it indicates that the fingers of the users stop sliding; or, if the touch coordinates change within the touch time, it indicates that the fingers of the users are sliding.

Under the condition that the touch coordinates do not change within the touch time (that is, the fingers of the users stop sliding), the upper computer stops sending the first waveform generation instruction corresponding to the active sub-area, to which the touch coordinates belong, to the waveform generator, such that power consumption is reduced, and the working time of the device is prolonged.

Figure 16:
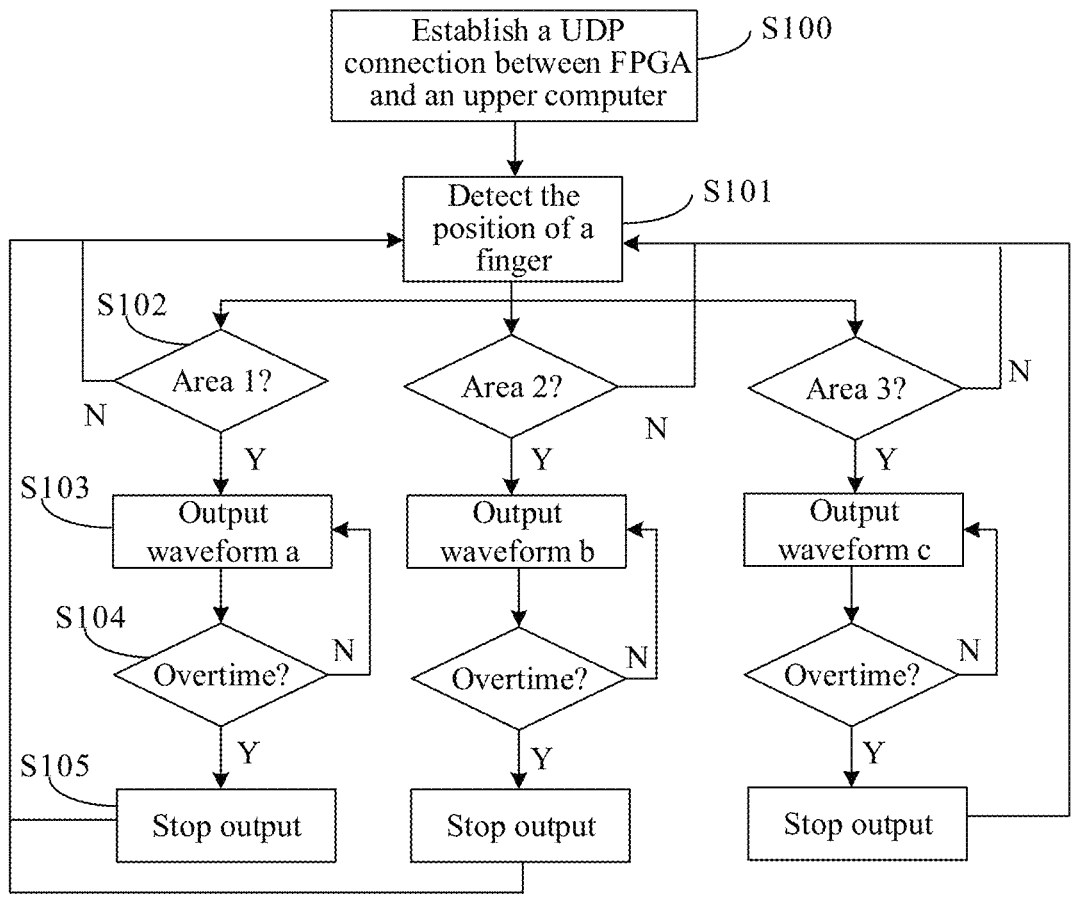
FIG. 16 illustrates a flow diagram of a control method of a touch display system.

The control method will be explained in detail below with the active area comprising three active sub-areas an example. As shown in FIG. 16, the control method comprises:

S100: establishing a UDP communication and connection between an FPGA waveform generator and an upper computer;

Specifically, a mac address of an FPGA board is bonded with an IP address by means of software of the upper computer.

S101: detecting, by a touch driving unit, the position of a finger, and transmitting touch coordinates and a touch time to the upper computer;

S102: determining, by the upper computer, an active sub-area to which the touch coordinates belongs;

S103: if the active sub-area to which the touch coordinate belong is an area 1, sending, by the upper computer, a first waveform generation instruction corresponding to the area 1 to a waveform generator, and outputting a waveform a by the waveform generator.

Illustratively, the waveform a may be a continuous sine wave.

S104: determining, by the upper computer, whether the touch coordinates change within the touch time; and S105: if not, determining that a touch is overtime, and enabling the upper computer to stop sending the first waveform generation instruction corresponding to the active sub-area, to which the touch coordinates belong, to the waveform generator, such that the waveform generator stops outputting the waveform to stop driving.

It should be noted that the steps of the control method in case where the active sub-area to which the touch coordinate belong is an area 2 or an area 3 is similar to steps S103-S105, and will no longer be detailed here. In addition, when the active sub-area to which the touch coordinates belong is the area 2, the waveform output by the waveform generator is a waveform b. When the active sub-area to which the touch coordinates belong is the area 3, the waveform generated by the waveform generator is a waveform c. The waveform b and the waveform c may be pulse waveforms with different cycles, or other waveforms, and the present disclosure has no limitation in this aspect.

Optionally, the touch display device further comprises a display driving unit electrically connected to the touch display panel and the upper computer.

After S01: acquiring touch information by a touch driving unit, and transmitting the touch information to an upper computer, the method further comprises:

S06: sending, by the upper computer, an image display instruction to the display driving unit according to the touch information; and S07: generating, by the display driving unit, an image signal according to the image display instruction to enable the touch display panel to display an image.

It should be noted that a corresponding relationship between the image display instructions and the first waveform generation instructions may be pre-stored in the upper computer, such that users may feel textures with their fingers and see images corresponding to the textures with their eyes when sliding their fingers on a touch surface of a touch display device, and thus, user experience is greatly improved.

Optionally, the touch display device further comprises at least one selection unit electrically connected to the upper computer, and the method further comprises:

S10: transmitting, by the selection unit, selection information to the upper computer;

S11: sending, by the upper computer, a second waveform generation instruction to the waveform generator according to the selection information; and S12: generating, by the waveform generator, a second waveform signal according to the second waveform generation instruction to enable the piezoelectric unit and the touch display panel to resonate.

It should be noted that a corresponding relationship between the selection units and the second waveform generation instructions may be pre-stored in the upper computer. The second waveform generation instructions corresponding to the selection units may be identical or different. To provide a richer haptic reproduction effect, the later is preferred. Illustratively, the touch display device comprises three selection units which are named a selection unit A, a selection unit B and a selection unit C, respectively; the second waveform generation instruction corresponding to the selection unit A may be an instruction enabling the waveform generator to generate a continuous waveform, the second waveform generation instruction corresponding to the selection unit B may be an instruction enabling the waveform generator to generate a pulse waveform with a first cycle, and the second waveform generation instruction corresponding to the selection unit C is an instruction enabling the waveform generator to generate a pulse waveform with a second cycle, wherein the first cycle is different from the second cycle. In this way, after selecting the selection unit A, the selection unit B and the selection unit C, the users may perceive three different textures when sliding their fingers on the touch surface of the touch display device.

By performing steps S10-S12, the upper computer is able to send the corresponding second waveform instruction to the waveform generator by determining the specific selection unit according to the selection information, the touch driving unit does not need to acquire the touch information, the upper computer does not need to determine the touch information, and this is another method for sending waveform instructions to the upper computer.

In actual application, users may select any one selection unit and then slide their fingers on the touch surface of the touch display device to obtain a texture touch feeling.

The haptic reproduction system provides two operation methods for users. According to one method, the users directly slide their fingers on the touch surface of the touch display device. According to the other method, the users select one selection unit first and then slide their fingers on the touch surface of the touch display device. Both methods allow the users to obtain a texture touch feeling. The haptic reproduction system has diversified functions and is high in selectivity.

Optionally, the touch display panel comprises an active area, and the active area comprises at least one active sub-area; and the selection unit corresponds to at least one active sub-area.

S11: sending, by the upper computer, a second waveform generation instruction to the waveform generator according to the selection information comprises:

S110: determining, by the upper computer, an active sub-area selected by user according to the selection information; and S111: sending, by the upper computer, the second waveform generation instruction corresponding to the active sub-area selected by the user to the waveform generator.

It should be noted that a corresponding relationship between the selection units and the active sub-areas may be pre-stored in the upper computer. The selection unit may correspond to all the active sub-areas (that is, the selection unit corresponds to all the whole active area of the touch display device), and in this case, if users select one selection unit, the fingers of the users may obtain a texture touch feeling on the touch surface in the whole active area. Or, the selection unit may correspond to part of the active sub-areas, and in this case, if the users select one selection unit, the fingers of the users may obtain a texture touch feeling on the touch surface in the part of active sub-areas corresponding to the selection unit.

Based on the corresponding relationship between the selection units and the active sub-areas and the corresponding relationship between the selection units and the second waveform generation instructions, users may feel different textures on the touch surface at different positions of the active area by selecting different selection units, such that the haptic reproduction effect of the haptic reproduction system is further improved.

"One embodiment", "an embodiment" or "one or more embodiments" in this specification means that specific features, structures, or characteristics described in conjunction with said embodiment are included in at least one embodiment of the disclosure. In addition, it should be noted that the expression "in one embodiment" does not definitely refer to the same embodiment.

A great plenty of specific details are provided in this specification. However, it can be understood that the embodiments of the disclosure can be implemented even without these specific details. In some embodiments, known methods, structures and techniques are not stated in detail to ensure that the understanding of this specification will not be obscured.

Finally, it should be noted that the above embodiments are merely used to explain the technical solutions of the present disclosure, and are not intended to limit the present disclosure. Although the present disclosure has been explained in detail with reference to the above embodiments, those ordinarily skilled in the art would appreciate that the technical solutions recorded in these embodiments can still be amended or part of the technical features in these embodiments can be equivalently substituted without causing the essence of corresponding technical solutions to deviate from the spirit and scope of the technical solutions of these embodiments.

The invention claimed is:

1. A haptic reproduction system, comprising a touch display device, an upper computer and a waveform generator;
    wherein the touch display device comprises a piezoelectric unit, a touch display panel and a touch driving unit, and the piezoelectric unit is disposed on the touch display panel;
    the touch driving unit is electrically connected to the touch display panel and the upper computer, and is configured to acquire touch information and transmit the touch information to the upper computer;
    the upper computer is electrically connected to the waveform generator, and is configured to send a first waveform generation instruction to the waveform generator according to the touch information;
    the waveform generator is configured to generate a first waveform signal according to the first waveform generation instruction;
    the piezoelectric unit is electrically connected to the waveform generator, and is configured to resonate with the touch display panel under the drive of the first waveform signal to change a friction on a touch surface of the touch display device;
    the touch display panel comprises an active area, and the active area comprises at least one active sub-area;
    the touch information comprises touch coordinates;
    the upper computer is also configured to determine the active sub-area to which the touch coordinates belong, and send the first waveform generation instruction corresponding to the active sub-area, to which the touch coordinate belong, to the waveform generator;
    the touch information further comprises a touch time;
    the upper computer is further configured to determine whether the touch coordinates change within the touch time; the touch coordinates changing within the touch time indicates that a finger of a user is sliding; and if the touch coordinates do not change within the touch time, indicating that the finger of the user stops sliding, the upper computer stops sending the first waveform generation instruction corresponding to the active sub-area, to which the touch coordinate belong, to the waveform generator;
    the touch display panel further comprises a touch base plate and a first display panel, the touch base plate is disposed on a light emitting side of the first display panel, and the piezoelectric unit is disposed on a side of the touch base plate;
    the touch display device further comprises a fixing part; and the fixing part is configured to fix the touch base plate and reserve a gap between the touch base plate and the first display panel; and
    the fixing part comprises a support part and a bonding part; wherein the support part is disposed on a side edge of the first display panel, the material of the support part comprises a sound absorption material, and the bonding part is disposed on a side, away from the first display panel, of the support part, and is bonded with the touch base plate.

2. The haptic reproduction system according to claim 1, wherein the touch display device further comprises at least one selection unit;
    the selection unit is electrically connected to the upper computer, and is configured to provide a selection function and transmit selection information to the upper computer;
    the upper computer is further configured to send a second waveform generation instruction to the waveform generator according to the selection information;
    the waveform generator is further configured to generate a second waveform signal according to the second waveform generation instruction; and
    the piezoelectric unit is further configured to resonate with the touch display panel under the drive of the second waveform signal.

3. The haptic reproduction system according to claim 2, wherein
    the selection unit corresponds to at least one of the active sub-areas; and
    the upper computer is further configured to determine the active sub-area selected by the user according to the selection information, and send the second waveform generation instruction corresponding to the active sub-area selected by the user to the waveform generator.

4. The haptic reproduction system according to claim 1, wherein the touch display device further comprises a display driving unit;
    the display driving unit is electrically connected to the touch display panel and the upper computer;
    the upper computer is further configured to send an image display instruction to the display driving unit according to the touch information; and
    the display driving unit is configured to generate an image signal according to the image display instruction to enable the touch display panel to display an image.

5. The haptic reproduction system according to claim 1, further comprising an amplification unit;
    wherein, the amplification unit is electrically connected to the waveform generator and the piezoelectric unit, and is configured to amplify the first waveform signal;
    the piezoelectric unit is further configured to resonate with the touch display panel under the drive of the amplified first waveform signal;
    wherein the amplification unit comprises an amplifier, and the waveform generator comprises an FPGA waveform generator.

6. The haptic reproduction system according to claim 1, wherein the piezoelectric unit comprises a plurality of piezoelectric patches, and each of the plurality of the piezoelectric patches comprises a piezoelectric layer, and a first electrode and a second electrode located on two opposite sides of the piezoelectric layer;
    the touch base plate comprises a substrate and a touch layer, the touch layer is disposed on a side of the substrate; the plurality of the piezoelectric patches are disposed on a side, away from the touch layer, of the substrate; and
    the first electrodes of the plurality of the piezoelectric patches are all grounded, and the second electrodes of the plurality of the piezoelectric patches are all electrically connected to the waveform generator.

7. The haptic reproduction system according to claim 6, wherein the plurality of the piezoelectric patches are divided into two groups, and each of the two groups is disposed on two opposite sides of the touch base plate along a first direction, respectively.

8. The haptic reproduction system according to claim 1, wherein the piezoelectric unit is disposed on a light emitting side of the touch display panel; the touch display panel comprises a touch layer and a second display panel, and the touch layer and the second display panel are of an integrated structure.

9. The haptic reproduction system according to claim 1, wherein a size of the gap in a direction perpendicular to a plane where the substrate is located is greater than 2 μm.

10. The haptic reproduction system according to claim 1, wherein the material of the bonding part comprises silicone, a Young modulus of the silicone is less than 0.1 MPa, and a density of the sound absorption material is greater than 0.01 g/cm$^3$.

11. A haptic reproduction system, comprising a touch display device, an upper computer and a waveform generator;
wherein the touch display device comprises a piezoelectric unit, a touch display panel and a touch driving unit, and the piezoelectric unit is disposed on the touch display panel;
the touch driving unit is electrically connected to the touch display panel and the upper computer, and is configured to acquire touch information and transmit the touch information to the upper computer;
the upper computer is electrically connected to the waveform generator, and is configured to send a first waveform generation instruction to the waveform generator according to the touch information;
the waveform generator is configured to generate a first waveform signal according to the first waveform generation instruction;
the piezoelectric unit is electrically connected to the waveform generator, and is configured to resonate with the touch display panel under the drive of the first waveform signal to change a friction on a touch surface of the touch display device;
the touch display panel comprises an active area, and the active area comprises at least one active sub-area;
the touch information comprises touch coordinates;
the upper computer is also configured to determine the active sub-area to which the touch coordinates belong, and send the first waveform generation instruction corresponding to the active sub-area, to which the touch coordinate belong, to the waveform generator;
the touch information further comprises a touch time;
the upper computer is further configured to determine whether the touch coordinates change within the touch time; the touch coordinates changing within the touch time indicates that a finger of a user is sliding; and if the touch coordinates do not change within the touch time, indicating that the finger of the user stops sliding, the upper computer stops sending the first waveform generation instruction corresponding to the active sub-area, to which the touch coordinate belong, to the waveform generator;
the touch display panel further comprises a touch base plate and a first display panel, the touch base plate is disposed on a light emitting side of the first display panel, and the piezoelectric unit is disposed on a side of the touch base plate;
the touch display device further comprises a fixing part; and the fixing part is configured to fix the touch base plate and reserve a gap between the touch base plate and the first display panel;
the touch display device further comprises a first frame;

the first frame comprises a first frame body and a second frame body, a step is formed between the first frame body and the second frame body, a side edge of the first display panel is disposed on a step surface, for forming the step, of the second frame body, and the fixing part is disposed on a step surface, for forming the step, of the first frame body; and
the fixing part comprises a first groove, and a side edge of the touch base plate is disposed in the first groove; and the material of the fixing part comprises a sound absorption material.

12. A method for controlling a haptic reproduction system, wherein the haptic reproduction system, including a touch display device, an upper computer and a waveform generator;
wherein the touch display device includes a piezoelectric unit, a touch display panel and a touch driving unit, and the piezoelectric unit is disposed on the touch display panel;
the touch driving unit is electrically connected to the touch display panel and the upper computer, and is configured to acquire touch information and transmit the touch information to the upper computer;
the upper computer is electrically connected to the waveform generator, and is configured to send a first waveform generation instruction to the waveform generator according to the touch information;
the waveform generator is configured to generate a first waveform signal according to the first waveform generation instruction;
the piezoelectric unit is electrically connected to the waveform generator, and is configured to resonate with the touch display panel under the drive of the first waveform signal to change a friction on a touch surface of the touch display device;
the touch display panel includes an active area, and the active area includes at least one active sub-area;
the touch information includes touch coordinates;
the upper computer is also configured to determine the active sub-area to which the touch coordinates belong, and send the first waveform generation instruction corresponding to the active sub-area, to which the touch coordinate belong, to the waveform generator;
the touch information further includes a touch time;
the upper computer is further configured to determine whether the touch coordinates change within the touch time; the touch coordinates changing within the touch time indicates that a finger of a user is sliding; and if the touch coordinates do not change within the touch time, indicating that the finger of the user stops sliding, the upper computer stops sending the first waveform generation instruction corresponding to the active sub-area, to which the touch coordinate belong, to the waveform generator;
the touch display panel further includes a touch base plate and a first display panel, the touch base plate is disposed on a light emitting side of the first display panel, and the piezoelectric unit is disposed on a side of the touch base plate;
the touch display device further includes a fixing part; and the fixing part is configured to fix the touch base plate and reserve a gap between the touch base plate and the first display panel;
the fixing part includes a support part and a bonding part; wherein the support part is disposed on a side edge of the first display panel, the material of the support part comprises a sound absorption material, and the bonding part is disposed on a side, away from the first display panel, of the support part, and is bonded with the touch base plate; and the method comprises:

acquiring, by the touch driving unit, the touch information, and transmitting the touch information to the upper computer;

sending, by the upper computer, the first waveform generation instruction to the waveform generator according to the touch information; and generating, by the waveform generator, the first waveform signal according to the first waveform generation instruction to enable the piezoelectric unit and the touch display panel to resonate.

13. The method according to claim 12, wherein the step of sending, by the upper computer, the first waveform generation instruction to the waveform generator according to the touch information, comprises:

determining, by the upper computer, the active sub-area to which the touch coordinates belong; and sending, by the upper computer, the first waveform generation instruction corresponding to the active sub-area, to which the touch coordinates belong, to the waveform generator.

14. The method according to claim 13, wherein, after the step of sending, by the upper computer, the first waveform generation instruction corresponding to the active sub-area, to which the touch coordinates belong, to the waveform generator, the method further comprises:

determining, by the upper computer, whether the touch coordinates change within the touch time; and if the touch coordinates do not change within the touch time, enabling the upper computer to stop sending the first waveform generation instruction corresponding to the active sub-area, to which the touch coordinates belong, to the waveform generator.

* * * * *